(12) United States Patent
Freiler

(10) Patent No.: US 10,668,424 B2
(45) Date of Patent: Jun. 2, 2020

(54) FILTER MEDIUM HAVING LARGE FOLD SPACING

(71) Applicant: FILTA Co., Ltd., Chonburi (TH)

(72) Inventor: Rudolf Freiler, Chonburi (TH)

(73) Assignee: IREMA-FILTER GMBH, Postbauer-Pavelsbach (DE)

( * ) Notice: Subject to any disclaimer, the term of this patent is extended or adjusted under 35 U.S.C. 154(b) by 238 days.

(21) Appl. No.: 15/529,020

(22) PCT Filed: Nov. 20, 2015

(86) PCT No.: PCT/TH2015/000082
§ 371 (c)(1),
(2) Date: May 23, 2017

(87) PCT Pub. No.: WO2016/085417
PCT Pub. Date: Jun. 2, 2016

(65) Prior Publication Data
US 2017/0259201 A1 Sep. 14, 2017

(30) Foreign Application Priority Data
Nov. 28, 2014 (DE) .......... 10 2014 117 506

(51) Int. Cl.
*B01D 46/52* (2006.01)
*B29C 48/00* (2019.01)
(Continued)

(52) U.S. Cl.
CPC ......... *B01D 46/523* (2013.01); *B01D 29/016* (2013.01); *B01D 46/0001* (2013.01);
(Continued)

(58) Field of Classification Search
CPC .............. B01D 46/523; B01D 46/0001; B01D 2265/02; B01D 29/016; B29L 2031/14;
(Continued)

(56) References Cited

U.S. PATENT DOCUMENTS 5,089,202 A * 2/1992 Lippold ............... B01D 29/012
264/145
5,172,585 A 12/1992 Gleissle
(Continued)

FOREIGN PATENT DOCUMENTS

CN  101757809  6/2010
CN  101410162  1/2012
(Continued)

OTHER PUBLICATIONS

Borealis Brochure; Borealis Polypropylene for Nonwoven Applications; 2004.
(Continued)

*Primary Examiner* — Robert Clemente
(74) *Attorney, Agent, or Firm* — Niels Haun; Dann, Dorfman, Herrell & Skillman, P.C.

(57) ABSTRACT

The inventive semi-finished product for a filter, particularly an air filter, comprises a filter medium, wherein said filter medium comprises a nonwoven having fibrous structure produced in a melt-spinning process and at least partially arranged in pleated layers.

26 Claims, 7 Drawing Sheets

Figure 1:
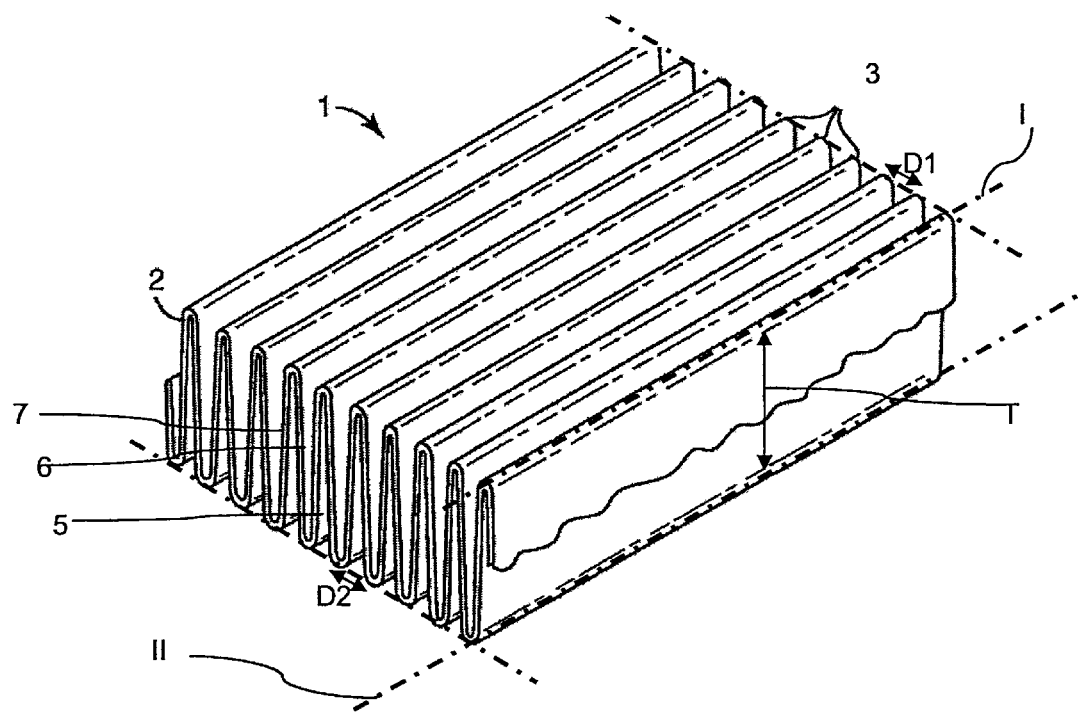

(51) Int. Cl.

| | | |
|---|---|---|
| *B29C 48/08* | (2019.01) | |
| *B01D 29/01* | (2006.01) | |
| *B01D 46/00* | (2006.01) | |
| *B29C 65/18* | (2006.01) | |
| *B29C 65/58* | (2006.01) | |
| *B29C 65/00* | (2006.01) | |
| *D01D 5/084* | (2006.01) | |
| *B29L 31/14* | (2006.01) | |

(52) U.S. Cl.
CPC ........ *B29C 48/002* (2019.02); *B29C 48/0021* (2019.02); *B29C 48/08* (2019.02); *B29C 65/18* (2013.01); *B29C 65/58* (2013.01); *B29C 66/0222* (2013.01); *B29C 66/431* (2013.01); *B29C 66/7294* (2013.01); *D01D 5/084* (2013.01); *B01D 2265/02* (2013.01); *B29L 2031/14* (2013.01)

(58) Field of Classification Search
CPC ..... B29C 65/18; B29C 65/58; B29C 66/0222; B29C 66/431; B29C 66/729; B29C 66/7294
See application file for complete search history.

(56) References Cited

U.S. PATENT DOCUMENTS

| | | |
|---|---|---|
| 5,486,410 A | 1/1996 | Groeger |
| 5,593,768 A | 1/1997 | Gessner |
| 5,714,067 A | 2/1998 | Sorrick |
| 6,454,989 B1 | 9/2002 | Neely |
| 9,242,201 B2 | 1/2016 | Bao |
| 2002/0037678 A1 | 3/2002 | Ohata |
| 2002/0122953 A1 | 9/2002 | Zhou |
| 2003/0200991 A1 | 10/2003 | Keck |
| 2006/0000196 A1 | 1/2006 | Beier |
| 2006/0096263 A1 | 5/2006 | Kahlbaugh |
| 2006/0223405 A1 | 10/2006 | Pourdeyhimi |
| 2008/0022642 A1 | 1/2008 | Fox |
| 2008/0120954 A1 | 5/2008 | Duello |
| 2008/0166533 A1 | 7/2008 | Jones |
| 2009/0044702 A1 | 2/2009 | Adamek |
| 2010/0159770 A1 | 6/2010 | Walser |
| 2010/0192531 A1 | 8/2010 | Bao |
| 2010/0247404 A1 | 9/2010 | Ptak |
| 2010/0305687 A1 | 12/2010 | Ajji |
| 2010/0307503 A1 | 12/2010 | Iwamoto |
| 2011/0180478 A1 | 7/2011 | Shah |
| 2012/0031063 A1 | 2/2012 | Soyama |
| 2012/0171408 A1 | 7/2012 | Turner |
| 2012/0309249 A1 | 12/2012 | Von Bokern |
| 2013/0197664 A1 | 8/2013 | Ballard |
| 2014/0202123 A1 | 7/2014 | Walz |
| 2015/0047508 A1* | 2/2015 | Sanocki ............... B01D 46/521 96/74 |

FOREIGN PATENT DOCUMENTS

| | | |
|---|---|---|
| CN | 101617072 | 7/2012 |
| DE | 2801211 | 7/1978 |
| DE | 3916838 | 11/1990 |
| DE | 291932 | 7/1991 |
| DE | 4123122 A1 | 1/1993 |
| DE | 4217195 A1 | 11/1993 |
| DE | 4443158 A1 | 6/1996 |
| DE | 69322572 T2 | 12/1998 |
| DE | 69320027 T2 | 2/1999 |
| DE | 29907699 | 8/1999 |
| DE | 69914346 | 7/2001 |
| DE | 69331065 | 10/2001 |
| DE | 60100409 | 7/2003 |
| DE | 69628752 | 4/2004 |
| EP | 0228512 | 1/1991 |
| EP | 0382330 | 1/1994 |
| EP | 2752231 | 7/2014 |
| EP | 1866472 | 11/2016 |
| GB | 941082 | 11/1963 |
| GB | 2404347 A1 | 2/2005 |
| JP | S59141173 | 8/1984 |
| JP | H02264057 A | 10/1990 |
| JP | H03137909 | 6/1991 |
| JP | H0440206 A | 2/1992 |
| JP | H05321115 A | 12/1993 |
| JP | H06346310 A | 12/1994 |
| JP | H0813309 | 1/1996 |
| JP | H09220427 | 8/1997 |
| JP | 2009011887 | 1/2009 |
| JP | 2013052321 | 3/2013 |
| JP | 2014184360 | 10/2014 |
| JP | 2015107482 | 6/2015 |
| RU | 2188693 C2 | 11/2000 |
| RU | 2198718 C1 | 10/2001 |
| WO | 9216361 | 10/1992 |
| WO | 9216361 A1 | 10/1992 |
| WO | 9517943 | 7/1995 |
| WO | 9517944 | 7/1995 |
| WO | 9705306 | 2/1997 |
| WO | 2004038078 | 5/2004 |
| WO | 2007061475 | 5/2007 |

OTHER PUBLICATIONS

Kathryn C. Dutton; Overbiew and Analysis of the Matblown Process and Parameters; Journal of Textile and Apparel,Technology and Management; vol. 6 Issue 1; Fall 2008; pp. 1-25.

Meltblown Nanofibres for Nonwovan Filtration Appilcations Filtration+ Separation; Nov. 2001.

Office Action in corresponding Japanese application 2017-547373 dated Sep. 2, 2019.

* cited by examiner

FILTER MEDIUM HAVING LARGE FOLD SPACING

RELATED APPLICATIONS

This application is a 371 application of International Application No. PCT/TH2015/000082 filed Nov. 20, 2015, which claims the benefit of priority of German Patent Application No. DE 10 2014 117 506.9 filed Nov. 28, 2014. Each of the foregoing applications is hereby incorporated herein by reference.

The invention relates to a semi-finished product for a filter, particularly for an air filter. The semi-finished product thereby comprises at least one filter medium which in turn comprises a nonwoven having fibrous structure produced in a melt-spinning process and arranged at least partially in pleated layers. Respective first adjacent layers exhibit at least one first embossing configured as a spacer between the at least two first adjacent layers. Respective adjacent layers exhibit at least one shared third embossing configured as a common fold edge between the respective adjacent layers. At least one pair of first embossings of the at least one first adjacent layers are in contact so as to form a spacer.

Semi-finished products having filter media of this type are used in filters, e.g. in liquid filters or air filters, particularly ventilation filters or filters for air-conditioning systems, vehicle interiors or engines.

Filter media made from nonwovens having fibrous structure; i.e. nonwoven fabrics, are usually produced during a primary shaping process, particularly in a melt-spinning process such as for example a spun-bond process or a melt-blown process as described for example in DE 412 31 22 A1.

The intake air of internal combustion engines, particularly in motor vehicles, is for instance normally filtered to protect the engine's combustion chamber from mechanical damage due to particles sucked in from the ambient air. An important criterion when designing such a filter is ensuring long service life along with concurrently high effective filtration of ingested particles.

Then again, motor vehicles have a precisely calculated energy distribution system. Only limited amounts of energy are available for heating/ventilation/cooling, particularly in the case of electric vehicles. Due to ever stricter exhaust regulations, these energy quantities continually need to be reduced, especially in the case of electric vehicles in which the most efficient possible use is to be made of the stored electrical energy with respect only to the driving operation of the vehicle. There are also narrow limits governing the costs of vehicle components. On the other hand, vehicle buyers are continually demanding greater comfort and safety.

Similar considerations also apply to air conditioning systems for buildings. Ever higher energy standards apply here as well, particularly in the case of ventilation systems with heat recovery.

With these considerations in mind, particle filters having the lowest possible pressure loss or pressure differential are of particular significance since the fan motor only needs to generate a low pressure and thus less energy is consumed. Moreover, due to the lesser amount of power required, such a fan motor also runs more quietly, which reduces noise and thus considerably increases driving comfort in the case of vehicles and residential or occupant comfort in the case of buildings.

The demand for filter systems having low pressure differentials competes with the required filtration efficiency and the required service life; thus in the case of vehicles, the amount of time expressed in mileage which a filter can remain in the vehicle before needing to be replaced. For example, pollen filters which solely filter pollen out of the air flowing into the vehicle are insufficient for vehicle interiors. The allergens which cause an immune system to react are proteins having diameters of only a fraction of the diameter of pollen. They are in the 0.1 µm range, i.e. the range which is most problematic for particle filters, the so-called MPPS (Most Penetrating Particle Size) range. Correspondingly, effective filtration at this size should be at least 50%, whereby this can be measured by means of an aerosol having particles of roughly the same size as the particles to be filtered, e.g. sodium chloride. At the same time, the service life of such filters installed into motor vehicles should be at least 30,000 kilometers.

In common filters, e.g. ring filters or frame filters, the filter medium has a zigzag folding; i.e. pleating, in order to increase the surface of the filter medium per filter surface unit of measure. The filter medium needs to have a certain rigidity in order to be able to be pleated. A certain rigidity to the filter medium is also desired in the pleated state to prevent the individual folds of the pleating from collapsing onto each other upon the inflow of the air to be filtered.

Using bicomponent fibers which combine the properties of two different polymers in one nonwoven fabric to increase rigidity is known in the prior art. For example, EP 1 866 472 B1 discloses a nonwoven fabric having high-tensile, tear-resistant components.

In order to ensure good flow-through and thus a low pressure drop or low pressure differential, spacers are generally provided between individual layers of the filter or filter medium respectively. DE 119 505 A1 discloses forming such spacers from embossed indentations and/or projections of opposite fold walls or layers. The projections/indentations are glued with mounted filaments of an adhesive.

Setting out from this prior art, it is a task of the invention to provide a semi-finished product for a filter, with its filter medium, respectively its layers, having high rigidity and stability, and which is able to be produced easily and economically.

This task is solved according to the invention by a semi-finished product in accordance with claim 1, a method in accordance with claim 18 and an apparatus in accordance with claim 24. Claim 17 claims a filter having a semi-finished product in accordance with the invention. The dependent claims set forth advantageous embodiments of the invention.

The inventive semi-finished product for a filter, an air filter in particular, comprises at least one filter medium, wherein the filter medium comprises a nonwoven having a fibrous structure produced in a melt-spinning process and at least partially arranged in pleated layers. Preferably, at least respective first adjacent layers of the semi-finished product exhibit at least one first embossing which is configured as a spacer between the at least two first adjacent layers. Preferably, at least one pair of first embossings of the at least one first adjacent layers are thereby in contact. Further preferably, respective adjacent layers having at least one shared fold edge formed by at least one third embossing and a pair of contacting embossings forming a spacer are stably and disengageably joined together without adhesive by a plurality of fibers being joined at respective intermediate areas of contacting pairs of embossings.

The inventive method for producing a semi-finished product for a filter, wherein the semi-finished product comprises a filter medium having a nonwoven produced in a melt-spinning process, preferably comprises the following process steps: Heating the filter medium; embossing the heated filter medium by means of two heated embossing rollers arranged opposite each other, wherein the embossing rollers are designed so as to preconfigure filter medium layers, wherein at least respective first adjacent layers have at least one first embossing configured as a spacer between the at least two of the first adjacent layers and wherein respective adjacent layers have at least one shared third embossing configured as a shared fold edge between the respectively adjacent layers; folding the first adjacent layers along the at least one third embossing, wherein at least one pair of first embossings of the first adjacent layers converge; and non-adhesively joining the at least one pair of first embossings, whereby the at least one pair of first embossings are stably and disengageably connected together.

The inventive apparatus for producing a semi-finished product for a filter, wherein the semi-finished product of a filter medium comprising a nonwoven produced in a melt-spinning process has a third heating device designed to heat the filter medium. The apparatus furthermore preferably comprises heatable embossing rollers, wherein the embossing rollers are designed so as to preconfigure layers of the filter medium, whereby each layer exhibits at least one first embossing configured as a spacer to an adjacent layer, one second embossing configured as a spacer to a further adjacent layer and at least one third embossing configured as a fold edge to at least one of the adjacent layers. The apparatus preferably comprises a folding device designed to fold two adjacent layers along at least one third embossing such that at least one pair of first embossings and/or at least one pair of second embossings of adjacent layers converge. It is further preferable for the apparatus to comprise a connecting device designed to join the at least one pair of first embossings and/or the at least one pair of second embossings without adhesive, whereby the respective embossings are stably and disengageably connected together.

The invention is based on the concept of keeping disruption of the filtering effect of the pleated layers due to the filter spacers as low as possible. The invention hereby incorporates the awareness that the surface of the filter medium should be subjected to the lowest possible reduction and/or modification due to the spacers as well as that the structure of the filter medium should not be altered by the provision of the spacers. Since the inventive spacers are formed by deformation of the filter medium, or its nonwoven with fibrous structure respectively, the filter medium also has a filtering effect at the surface of the spacer. Furthermore, embossings of adjacent contacting layers can only be fixed against each other according to the invention by a plurality of individual fibers of the layer's embossing being joined to a plurality of fibers of the other layer's embossing. In particular, adhesive and spot welds are not necessary to fix the individual layers or spacers. In contrast to the prior art (adhesive beading, welding), the provision of spacers increases the active filtration area, i.e. that which is involved in the filtering provided by the semi-finished product or of a filter provided with said semi-finished product. This both increases the service life of the respective filter as well as reduces the respective filter's pressure drop and/or pressure differential.

A fold in the sense of the invention preferably consists of at least two pleated layers.

Disengageably joined within the meaning of the present invention means that a plurality of fibers on a surface of a first layer are coupled to a plurality of fibers on a surface of a second layer such that the two layers can be separated without destroying the filter medium; i.e. without it suffering the loss of its filtering action, e.g. by cracks forming.

An embossing roller within the meaning of the invention is a primary shaping tool which applies pressure onto a filter material and deforms its when embossing.

A melt-spinning process within the meaning of the invention is a method of extruding a polymer melt as a fiber strand through at least one nozzle bore of a spinneret, for example the melt-blown process or the spun-bond process.

A semi-finished product within the meaning of the invention is a prefabricated object and is produced as an intermediate product in a product's manufacturing process; in the present case, particularly that element providing the filtration action in a filter. A semi-finished product is thus in particular an intermediate product.

A fold plane in the sense of the invention is a plane spanned by adjacent fold edges.

Joining within the meaning of the invention is a sustained connecting of at least two components, for example the layers of a folding, particularly the embossings of oppositely disposed layers.

In one advantageous embodiment of the inventive semi-finished product, the respective second adjacent layers exhibit at least one second embossing configured as a spacer between the second adjacent layers. A pair of second embossings of the second adjacent layers are in contact. The second adjacent layers also exhibit at least one common fold edge formed by at least one third embossing in this advantageous embodiment and the pair of contacting second embossings is stably and disengageably joined together without adhesive by a plurality of fibers being joined at the intermediate layer between the pair of second embossings. Preferably, each of the layers exhibits both first as well as second embossings, each serving a respective layer as a spacer to the adjacent layer and vice versa. As the invention describes, there is preferably a plurality of pleated layers in a filter having a filter medium.

In a further advantageous embodiment of the inventive semi-finished product, the at least two first embossings are arranged on one side of the filter medium and the at least two second embossings are arranged on a second side of the filter medium.

In a further advantageous embodiment of the inventive semi-finished product, a spacing of adjacent folds of the pleated layer in a semi-finished product fold plane preferably amounts to at least approximately 10 mm, preferentially at least approximately 12 mm, particularly preferentially at least approximately 14 mm, further preferentially at least approximately 16 mm, further preferentially at least approximately 18 mm, most preferentially at least approximately 20 mm and/or further preferably no greater than approximately 30 mm, preferentially no greater than approximately 28 mm, particularly preferentially no greater than approximately 26 mm, further preferentially no greater than approximately 24 mm, further preferentially no greater than approximately 22 mm, most preferentially no greater than approximately 20 mm. Since the pressure differential is subject to the pleated filter medium's fold spacing, it is advantageous in some applications to provide relatively large spacings of more than 10 mm between adjacent fold edges. Although this reduces the effective filtration area of a filter relative to its end face, it improves the flow of a medium to be filtered through the individual folds between adjacent layers.

In a further advantageous embodiment of the inventive semi-finished product, the ratio of a first adjacent fold edge spacing and/or a second adjacent fold edge spacing to a depth of a semi-finished product is preferably greater than approximately 0.05, preferentially preferentially greater than approximately 0.07 and particularly preferentially greater than approximately 0.09 and/or further preferably less than approximately 0.15, preferentially less than approximately 0.12 and particularly preferentially less than approximately 0.10, most preferentially approximately 0.069, 0.087 or 0.114. The relatively high D1/T or D2/T ratio according to the invention allows using the entire depth of the semi-finished product fold since the air flowing through a geometry more advantageous to the fluid mechanics of the fluid to be filtered is not hindered by inflow at the "rear" area; i.e. at great distance from the open fold edges of a fold. For example, an area in which filtering no longer even occurs due to back pressure developing in a fold is reduced or even prevented. This thereby results in a high effective filtration area, an even flow, less loss of filter and an increased degree of utilization.

In a further advantageous embodiment of the inventive semi-finished product, the fold edges exhibit different spacings in different fold planes. This thereby allows varying of the spacing between adjacent layers opening to the one side of the filter and between layers opening to the other side of the filter. Preferably, this embodiment can be combined with fold edges of different widths. This enables different forms of the semi-finished product to be realized, e.g. star or even corrugated filters.

In a further advantageous embodiment, a first surface and/or a second surface of respective adjacent layers at least in part comprise loops and/or hooks at least in the region of the embossings which are designed to engage upon the adhesive-free joining at the respective intermediate area of contacting pairs of embossings and which in particular are formed by at least one of the plurality of fibers. Preferably, this advantageous embodiment is of a type of hook-and-loop or Velcro fastening. This type of non-adhesive joining enables the joining process to be of particularly simple design since the adjacent layers only need to be pressed together when the filter medium is pleated.

In a further advantageous embodiment of the inventive semi-finished product, the plurality of fibers of contacting pairs of embossings are partially fused at the respective intermediate areas.

Individual fibers of at least one of the adjacent layers hereby fuse with one or more fibers of the other adjacent layer. Preferably, individual fibers of both adjacent layers respectively fuse with individual fibers of the respective other adjacent layer and vice versa. This advantageous embodiment as well is characterized by the non-adhesive joining substantially occurring only at the surface of the filter material, particularly by the fibers forming the surface. This substantially preserves the material structure, in particular the fibrous structure, of the filter medium. The effective filtration area is also enlarged in this advantageous embodiment by realizing the embossings, particularly the first and second embossing, with particle filtration and the flow of fluid to be filtered still being possible even at the intermediate area formed by adjoining embossings of adjacent layers.

In a further advantageous embodiment of the method according to the invention, the first adjacent layers and/or the second adjacent layers are non-destructively disengageable, particularly by the tearing apart of individual fibers or disengaging at least individual fibers of adjacent layers, particularly the plurality of fibers of a first layer from a first surface and/or individual fibers, particularly the plurality of fibers, of a second layer from a second surface, whereby the individual fibers take part in the non-adhesive joining. Preferably, the inventive semi-finished product is particularly characterized by the application of a force having a parallel component counter to the mating direction being able to disengage the non-adhesively joined connection. This is possible due to only individual fibers or bundles of fiber producing the connection and/or joining both when adjacent layers are connected by loops and/or hooks as well as when individual fibers are connected by fusing. Even if these individual fibers or fiber bundles are torn apart or disengaged from the surface of the filter medium, the material structure, in particular the fibrous structure, of the individual layers of the filter medium does not thereby change.

In a further advantageous embodiment of the semi-finished product according to the invention, same is obtained or obtainable by brushing a first surface of the filter medium such that loops and/or hooks are produced on the at least one pair of first embossings which engage at a first intermediate area upon the non-adhesive joining.

In a further advantageous embodiment of the inventive semi-finished product, same is obtained or obtainable by brushing a second surface of the filter medium such that loops and/or hooks are produced on the at least one pair of second embossings which engage at a second intermediate area upon the non-adhesive joining.

In a further advantageous embodiment of the inventive semi-finished product, same is obtained or obtainable by thermal treatment of a first surface and the filter medium by way of a first heating device at least partly melting fibers of opposite first embossings and joining the first embossings upon their converging, wherein the fibers of the first adjacent layers (5, 6) establish a connection.

In a further advantageous embodiment of the inventive semi-finished product, same is obtained or obtainable by thermal treatment of a second surface and the filter medium by way of a second heating device at least partly melting fibers of opposite second embossings and joining the second embossings upon their converging, wherein the fibers of the second adjacent layers establish a connection.

In a further advantageous embodiment of the inventive semi-finished product, same is obtained or obtainable by folding two adjacent layers along a third embossing, wherein at least one pair of first embossings of the first adjacent layers meet; and/or folding two adjacent layers along a further third embossing, whereby at least one pair of second embossings of the second adjacent layers meet. The folding can hereby preferably take place both prior to a thermal treatment as well as subsequent to a thermal treatment. The thermal treatment of the second surface can preferably also occur at the same time as the thermal treatment of the first surface. Preferably, however, the thermal treatment of the second surface can also occur subsequent to the folding of the first adjacent layer (first fold) and prior to the folding of the second adjacent layer (second fold).

In a further advantageous embodiment of the inventive semi-finished product, the filter medium likewise has a fibrous structure in the region of the respective intermediate area between adjacent layers, particularly the first intermediate area and/or the second intermediate area. This thereby allows also using the area of the intermediate area as an effective filtration area. No sealing of the surface or even a modification to the material structure of the filter medium occurs in the area of the joining.

In a further advantageous embodiment of the inventive semi-finished product, the common fold edge incorporates two parallel straight third embossings over the entire width of the filter medium in such a way that the common fold edge is of trapezoidal form. Such a design to the fold edge better defines the folding on the one hand and, on the other, prevents the filter medium of the adjacent layers from abutting against the fold edge in such a way as to round the fold edge. Also a substantial advantage of this advantageous embodiment, however, is that the provision of the double embossing forms the fold edge as a surface. This creates further stabilization or reinforcement respectively of the filter medium and hence the semi-finished product or composite filter.

The above-described aspects of the invention and the associated features disclosed relative to further developing the semi-finished product according to the invention also applies analogously to the further aspects of the invention described below and the associated features disclosed relative to further developing the inventive method and the inventive apparatus for producing a semi-finished product and vice versa. All of the advantageous embodiments can in principle be combined with one another.

In one advantageous embodiment of the method according to the invention, same further comprises the process step of brushing a first surface of the filter medium such that loops and/or hooks are produced on the at least one pair of first embossings which engage when being non-adhesively joined.

In a further advantageous embodiment of the inventive method, same further comprises the following process steps: Folding second adjacent layers along a further third embossing, whereby at least one pair of second embossings of second adjacent layers converge; brushing a second surface of the filter medium so as to produce loops and/or hooks on the at least one pair of second embossings; non-adhesively joining the at least one pair of second embossings, whereby loops and/or hooks engage so that at least one pair of first embossings are stably and disengageably connected together.

In a further advantageous embodiment of the inventive method, same comprises the further process step of a guiding device surrounding the first adjacent layers and/or second adjacent layers and guiding the adjacent folds during the non-adhesive joining.

In a further advantageous embodiment of the inventive method, same further comprises the following process steps: Thermally treating a first surface of the filter medium by way of a first heating device at least partly melting fibers of opposite first embossings; and joining the first embossings upon their converging, wherein the fibers of the first adjacent layers establish a connection.

In a further advantageous embodiment of the inventive method, same further comprises the following process steps: Thermally treating a second surface of the filter medium by way of a second heating device at least partly melting fibers of opposite second embossings; and joining the second embossings upon their converging, wherein the fibers of the second adjacent layers establish a connection. The thermal treatment of the surface is preferably effected by a first heating device and/or a second heating device, particularly a type of radiant heater which heats the surfaces of the filter medium. Alternatively or additionally, the first heating device is preferably set between the at least one first adjacent layers, whereby fibers of the at least one pair of opposite first embossings are at least partly melted. In the realizing of the first heating device of this embodiment, the at least one first opposite embossings coalesce and the fibers of the first adjacent layers preferably coalesce. Alternatively or additionally, the second heating device is preferably set between the at least one second adjacent layers, by which fibers opposite to the at least one pair of second embossings are at least partly melted. The second embossings preferably meet each other when the second heating device is realized and the fibers of the second adjacent layers preferably coalesce.

In a further advantageous embodiment of the inventive method, the first heating device is set substantially perpendicular to a method processing direction. In a further advantageous embodiment of the inventive method, the second heating device is set substantially in the opposite direction to the direction at which the first heating device is set.

In a further advantageous embodiment of the inventive method, same preferably further comprises at least one of the following process steps: Folding two adjacent layers along a third embossing, whereby at least one pair of first embossings of the first adjacent layers meet; and/or folding two adjacent layers along a further third embossing, whereby at least one pair of second embossings of the second adjacent layers meet.

The sequence of the individual process steps can be varied: Thus, the thermal treatment of the second surface can preferably also occur simultaneously to the thermal treatment of the first surface. Preferably, however, the thermal treatment of the second surface can also occur subsequent to the folding of the first adjacent layers (first fold) and prior to the folding of the second adjacent layers (second fold). The invention is claimed and defined using two foldings as an example. It is however obvious to the person skilled in the art that the inventive process steps can be repeated as often as necessary or indefinitely in order to produce a desired number of semi-finished product foldings. Correspondingly, the semi-finished product according to the invention preferably exhibits a plurality of folds; i.e. has a plurality of first adjacent layers and a plurality of second adjacent layers.

In a further advantageous embodiment of the inventive apparatus, same further comprises a brushing device designed to create loops and/or hooks on the first surface and/or the second surface of the filter medium which lend themselves to engaging when being non-adhesively joined.

In a further advantageous embodiment of the inventive apparatus, the connecting device comprises at least one first heating device designed to at least partly melt fibers of first embossings oppositely disposed to at least one first embossing and/or a second heating device designed to at least partly melt fibers of second embossings oppositely disposed to at least one second embossing.

Figure 2A:
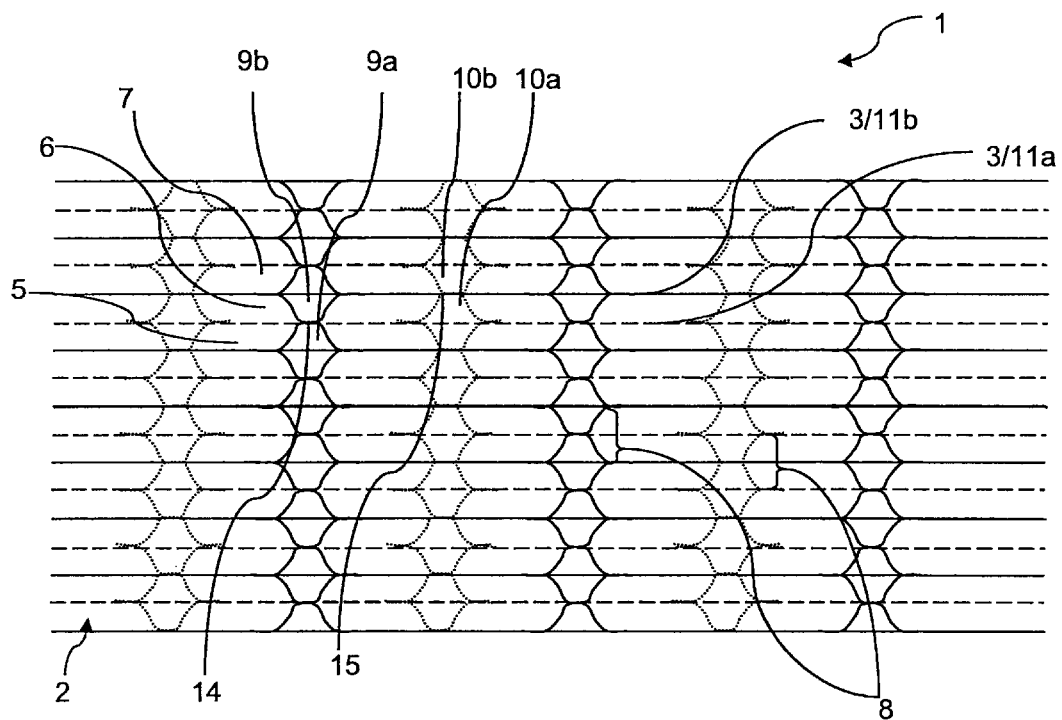
Figure 2B:
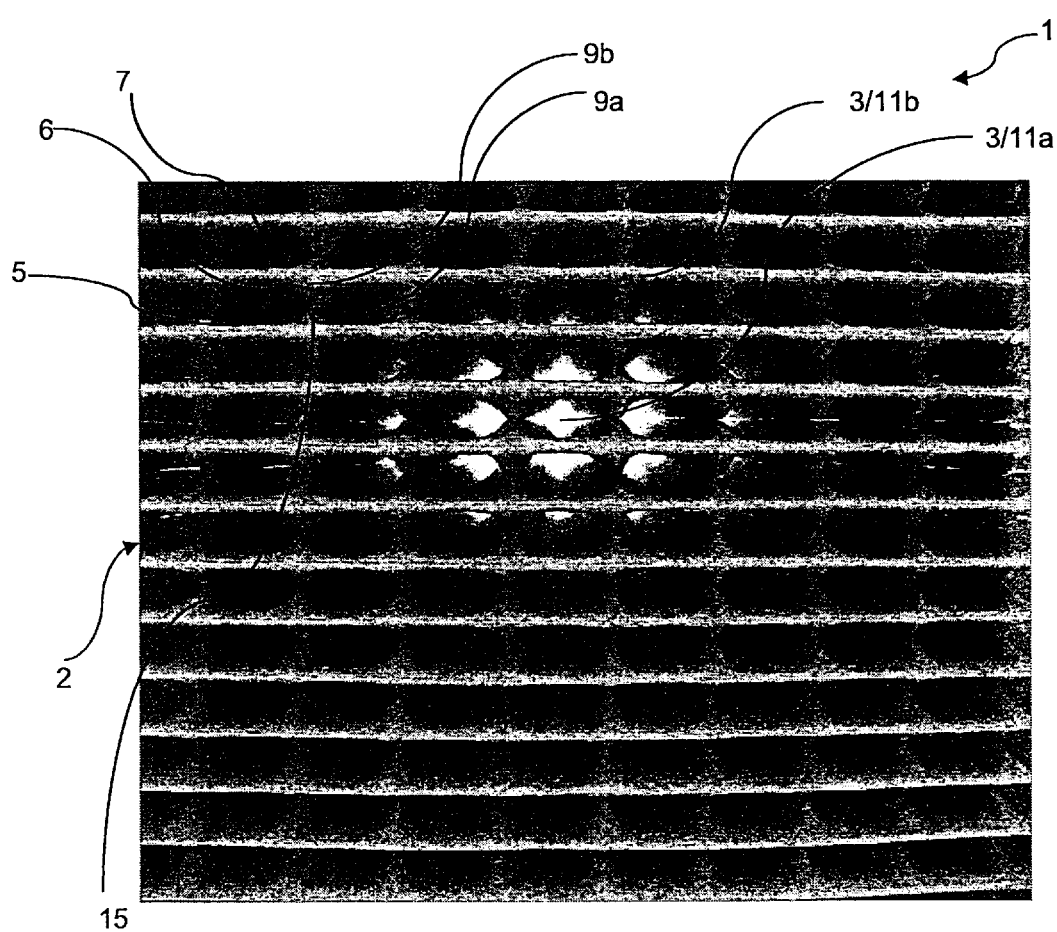
Figure 3:
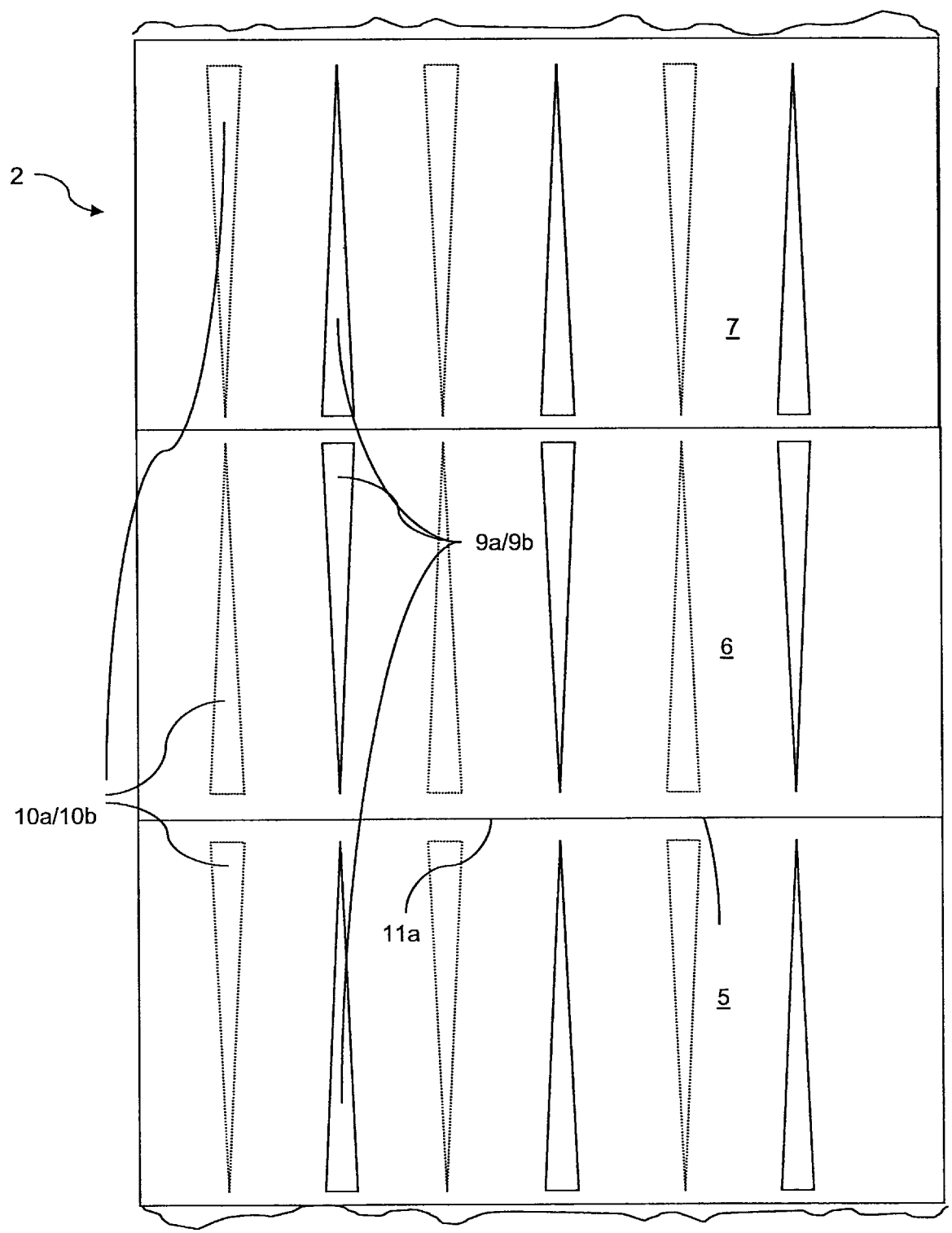
Figure 4A:
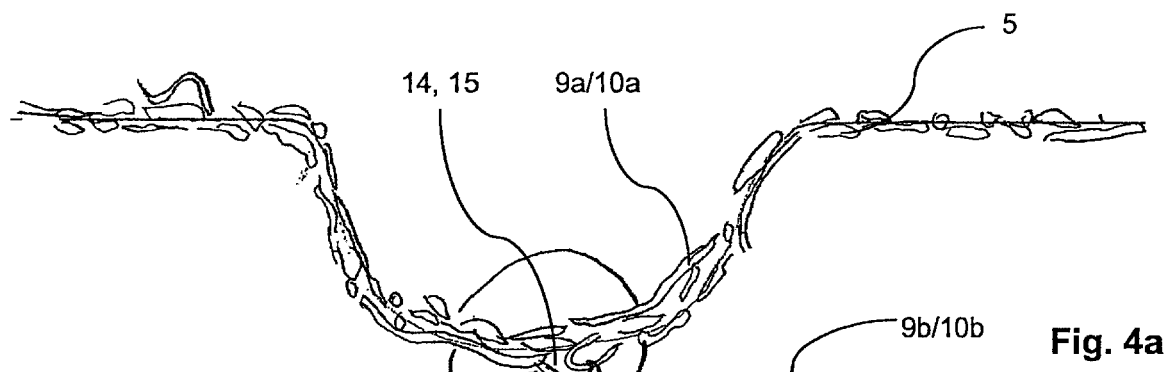
Figure 4C:
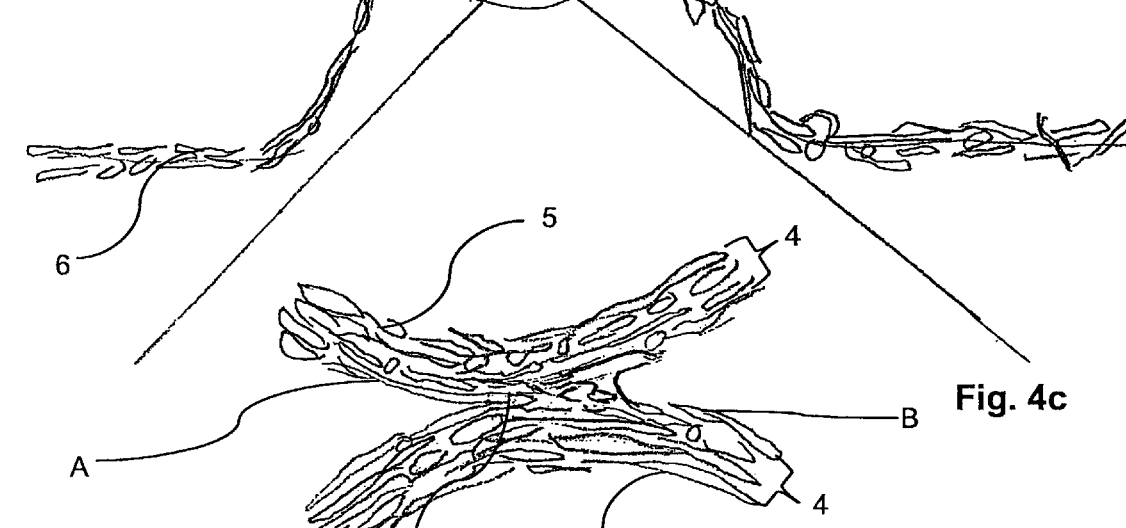
Figure 4B:
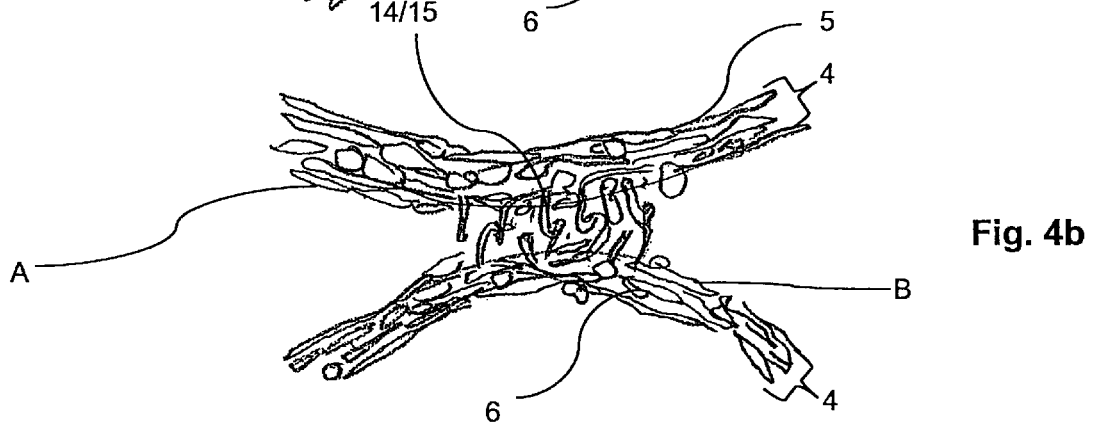
Figure 5:
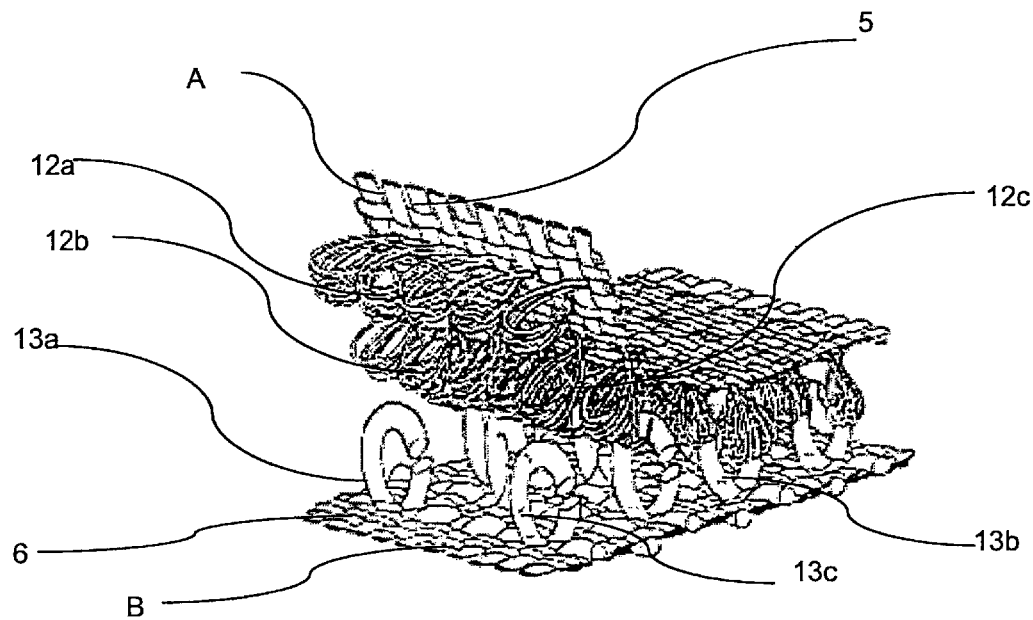
Figure 6:
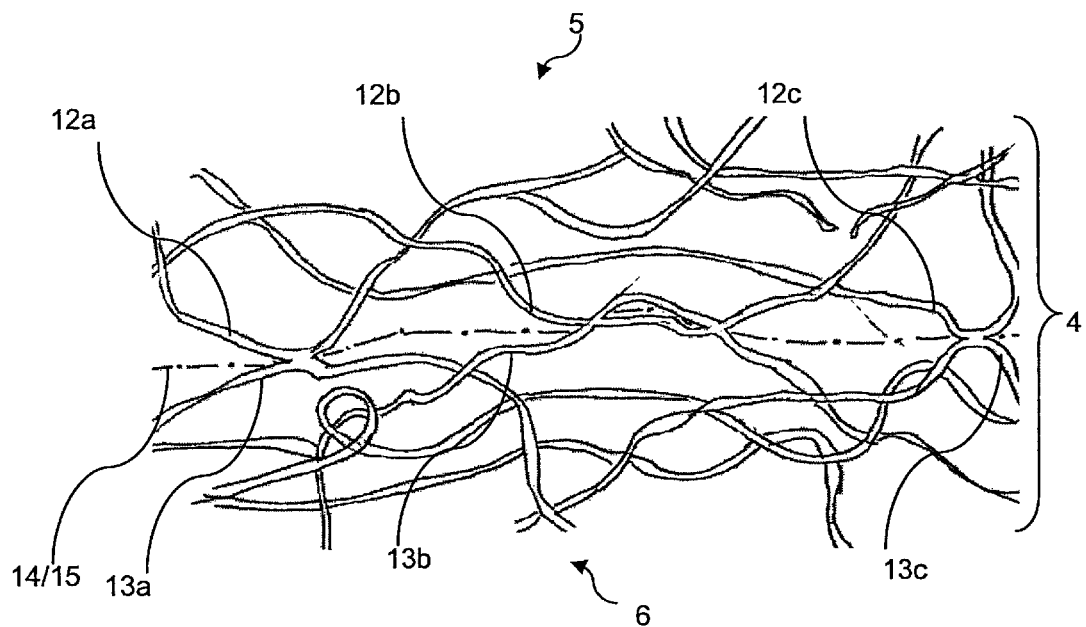
Figure 7:
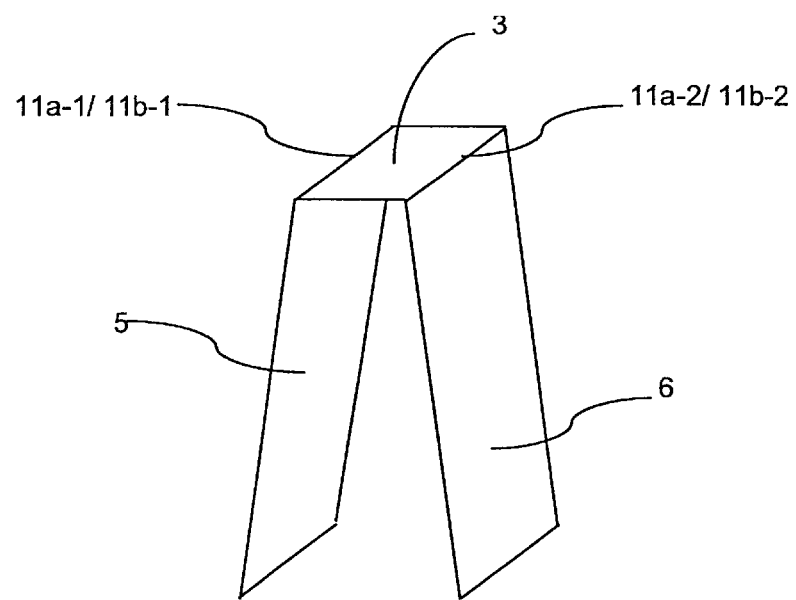
Figure 8:
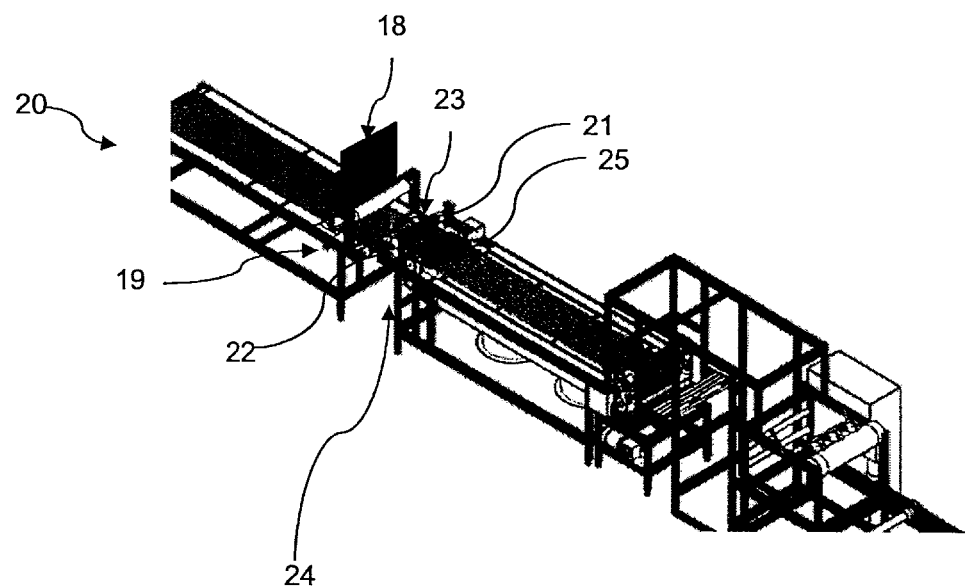
Figure 9:
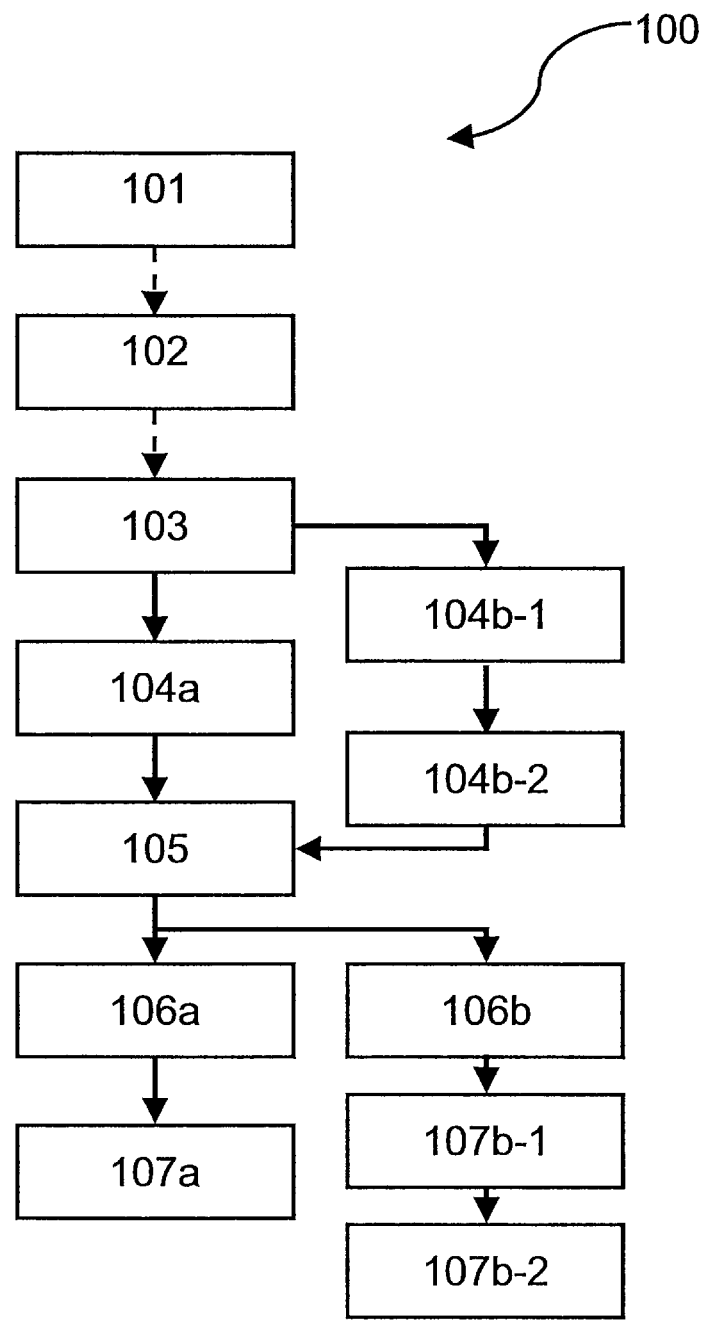

Further features, advantages and possible applications of the invention are set forth in the following description in conjunction with the partly schematic depictions shown in the figures. Shown are:

FIG. 1 one embodiment of an inventive semi-finished product for a filter;

FIGS. 2a, 2b a plan view of the inventive semi-finished product according to FIG. 1;

FIG. 3 a plan view of embossed filter medium according to one embodiment of the inventive semi-finished product;

FIGS. 4a, 4b, 4c different degrees of magnification of a cross section through two adjacent layers of a filter medium in the area of first or second embossings according to two embodiments of the inventive semi-finished product;

FIG. 5 a depiction of a joining technique according to one first embodiment of the inventive semi-finished product;

FIG. 6 a depiction of a joining technique according to a second embodiment of the inventive semi-finished product;

FIG. 7 a fold edge according to one embodiment of the inventive semi-finished product;

FIG. 8 an embodiment of an inventive apparatus for producing a semi-finished product; and FIG. 9 a block diagram of one embodiment of the inventive method for producing a semi-finished product for a filter.

FIG. 1 shows an embodiment of the inventive semi-finished product 1. The semi-finished product consists preferably of a filter medium 2 pleated into layers 5, 6, 7, wherein multiple fold edges 3 of the pleating and/or folding are preferably arranged in a first fold plane I and opposite fold edges 3 in a second fold plane II. The fold planes I, II are preferably at a spacing T which indicates the depth of the semi-finished product or foldings respectively. The fold edges 3 in the first fold plane I are at a spacing D1, the fold edges 3 in the second fold plane II are at a spacing D2. The ratio of the first adjacent fold edge spacing D1 and/or second adjacent fold edge spacing D2 to a depth (T) of the semi-finished product is in the range of approximately 0.05 to approximately 0.15, preferentially between approximately 0.069 and approximately 0.114, most preferentially approximately 0.087.

The semi-finished product 1 is particular suited, together with a frame in which the semi-finished product 1 is fixed, to form a frame filter.

A top plan view of at least one section of the semi-finished product 1 according to FIG. 1 is depicted schematically in FIG. 2a and as a photograph in FIG. 2b. As is also the case in FIG. 1, elements which repeat across the entire semi-finished product 1 are, by way of example, only identified once by reference numeral for the sake of simplicity. Individual layers 5, 6, 7 are preferably held in place and simultaneously fixed together by spacers 8. The spacers 8 hereby preferably consist of first embossings 9a, 9b on a first side of the filter medium 2 (depicted in FIG. 2a with solid lines since they are visible from above) and/or second embossings 10a, 10b on a second side of the filter medium 2. As will also be explained at further points in relation to FIG. 3, a first embossing 9a is disposed on a first layer 5 and a first embossing 9b is disposed on a second layer 6 in such a way as to come into contact when the filter medium is folded at the respective third embossing 11a forming fold edge 3 in fold plane II. The same applies to the spacers formed by the second embossings 10a, 10b and disposed on the second side of the filter medium 2 (depicted in FIG. 2a by a dotted line as they are not visible but instead covered by the filter medium 2). Hence, a second embossing 10a on the one third layer 7 meets a second embossing 10b on the second layer 6 when the filter medium is folded along the respective third embossing 11b which then likewise forms a fold edge 3, albeit in fold plane I.

It is clear from FIG. 2b, which represents a photograph through a semi-finished product 1 against a light background, that the spacers 8 keep filter channels open through the entire depth of the filter medium such that one can see through the semi-finished product 1 and light can shine through the filter medium 2 in the area of the second fold plane 2 to the rear side of the semi-finished product 1. The open geometry of the semi-finished product 1 due to the design of the spacers 8, the advantageous ratio of fold spacing D1, D2 to the semi-finished product depth and the relatively high rigidity to the filter medium 2 provided with embossings ensures a particularly good flow rate through the semi-finished product 1 or a filter produced from same respectively.

Because of the open structure to the semi-finished product 1, or a filter formed from same respectively, particularly low pressure differentials or drops in pressure can be realized when a medium to be filtered flows through the semi-finished product 1. As the FIG. 2b photograph shows, the embossings, likewise of filterable fibrous structures 9a, 9b, 10a, 10b, also enlarge the filtration area of the semi-finished product 1 and/or a filter formed from same. As will be explained at further points in relation to FIGS. 4a, 4b, 4c, 5 and 6, even a respective first intermediate area 14 between the first embossings 9a, 9b and/or a second intermediate area 15 between the second embossings 10a, 10b preferably has/have a filtering effect; i.e. also these embossed surfaces add to the effective filtration areas.

FIG. 3 shows a section of a length of the embossed filter medium 2 prior to pleating. The embossings 9a, 9b, 10a, 10b, 11a, 11b of a first layer 5, a second layer 6 and a third layer 7 are depicted here as an example. The first embossings 9a, 9b and the second embossings 10a, 10b of a layer, e.g. second layer 6, are hereby arranged so as to each be axially symmetrical to the third embossings 11a, 11b of the respective adjacent layer, in this case, first layer 5 relative to third embossing 11a and third layer 7 relative to third embossing 11b. This thereby ensures that the first embossings 9a, 9b and the second embossings 10a, 10b converge when the filter medium 2 is folded during the pleating process so as to each form a respective spacer 8. As FIG. 3 shows, the first embossings 9a, 9b and the second embossings 10a, 10b are each formed as a triangular form. This shape, which by no means needs to correspond to an exact triangle as shown in FIG. 3, results from the embossing, which is preferably produced by a embossing roller 22, 23, being deeper at the wide end of the triangle on the triangle's short side than at the end tapering to a point. Correspondingly, the height of the embossings 9a, 9b, 10a, 10b increases from the tip of the triangle to the obtuse side of the triangle so that the spacer 8 formed by the first and second embossings 9a, 9b, 10a, 10b yields a folded height to the fold edges 3 formed by the respective adjacent layers 5, 6, 7 which decreases over the depth of the semi-finished product 1.

FIG. 4a shows a magnified cross section through the filter medium 2 in the region of contacting first embossings 9a, 9b or in the region of contacting second embossings 10a, 10b of respective adjacent first and second layers 5, 6 or second or third layers 6, 7 perpendicular to the direction of extension of the respective first embossings 9a, 9b or second embossings 10a, 10b. This figure, like FIGS. 4b, 4c, 5 and 6, is at least partly schematic and the forms to the embossings 9a, 9b, 10a, 10b are purely an example. With regard to the filter medium 2, the individual fibers which form the first layer 5 and the second layer 6 are also depicted at least partly schematically. The dimensions of the fibers as well as the embossings 9a, 9b, 10a, 10b are likewise at least partly schematic and thus preferably do not correspond to the actual dimensions of the filter medium 2 of a semi-finished product 1.

Preferably, a first embossing 9a of the first layer 5 having a first surface A forms an intermediate area 14 with a first embossing 9b of the second layer 6 having a second surface B. Correspondingly, a first surface A of the first layer 5 forms a second intermediate area 15 with a second surface B of the second layer 6 in the region of the second embossing 10a of the first layer 5 and the second embossing 10b of the second layer 6.

FIG. 4b shows the enlarged region around a first intermediate area 14 or a second intermediate area 15 in a first embodiment of the inventive semi-finished product 1. Loops and/or hooks are hereby formed on the first surface A of the first layer 5 at least in the region of the respective intermediate area 15. Correspondingly, loops and/or hooks are also formed on the second surface B of the second layer 6. When the first embossings 9a, 9b or the second embossings 10a, 10b are joined together upon the folding of the filter medium 2, the loops and/or hooks formed by the first fibers 12a, 12b, 12c of the first layer 5 preferably engage with the loops and/or hooks 16a, 16b, 16c of the second layer 6 so as to produce a joining between the respective fibers 16a, 16b, 16c, 17a, 17b, 17c at least in the region of the intermediate areas 14, 15 which fixes the first embossings 9a, 9b or the second embossings 10a, 10b together. Preferably, as depicted in FIG. 5, a Velcro-type principle is hereby used to join the respective embossings 9a, 9b 10a, 10b. Loops in particular are preferably disposed on the first surface A, formed by a plurality of first fibers 12a, 12b, 12c of the first layer 5, and hooks 13a, 13b, 13c are disposed on the second surface B, formed by a plurality of second fibers 13a, 13b, 13c of the second layer 6. The hooks thereby engage with the loops, yielding a stable yet disengageable attachment or fixing. Even as the first layer 5 and the second layer 6 are illustrated as woven materials in FIG. 5, this principle can also be applied to a nonwoven material of fibrous structure in accordance with the inventive semi-finished product 1.

FIG. 4c shows, as does FIG. 4b, an enlarged region of the first intermediate area 14 or the second intermediate area 15 according to a second embodiment of the inventive semi-finished product 1. In this second embodiment, a plurality of first fibers 12a, 12b, 12c on the first surface A of the first layer 5 is preferably fused with a plurality of second fibers 13a, 13b, 13c on the second surface B of the second layer 6.

With regard to this second embodiment, FIG. 6 shows a further enlarged view of at least one section of the first intermediate area 14 or the second intermediate area 15. Thermal action respectively joins the first fibers 12a, 12b, 12c with fibers 13a, 13b, 13c at least at one point within the respective intermediate area 14, 15. By so doing, the first embossings 9a, 9b and/or the second embossings 10a, 10b are fixed to one another. Preferably, however, by no means do all the first fibers of the first layer 5 and/or the second fibers of the second layer 6 engage with the fibers of the respective other layer. There are preferably also fibers on the first surface A and the first surface B, or the intermediate areas 14, 15 formed by same respectively, which do not bond with the respective surfaces A, B. As is evident from FIGS. 4a, 4b, 4c and 5, a substantial aspect of the invention is that a fibrous structure 4 of the filter medium 2, particularly in the region of the first embossing 9a, 9b, the second embossing 10a, 10b and there in turn particularly in the region of the intermediate areas 14, 15, is preferably not substantially affected. The presence of the fibrous structure 4 over said regions ensures that particle filtering can also take place in these regions and thus the embossings and the joinings do not reduce the effective filtration area. This constitutes a major advantage over prior art semi-finished products and filters which use adhesive, adhesive beads and/or welds to join adjacent layers, which seals the surface of a filter medium or even the interior of the filter.

FIG. 7 depicts an embodiment of a fold edge of an inventive semi-finished product 1. This embodiment is characterized by the fold edge 3 being formed by a double bending or buckling of the filter medium 2. This bending between a first layer 5 and a second layer 6, which form first adjacent layers 5, 6, can be achieved by providing the inventive semi-finished product with two respective third embossings 11a-1, 11a-2 of the first layer 5 and the second layer 6 during the embossing of the filter medium 2 and/or two respective third embossings 11b-1, 11b-2 between the second layer 6 and the third layer 7. Upon the folding and/or pleating of the filter medium 2, same bend both along the embossings 11a-1, 11b-1 as well as along the embossings 11a-2, 11b-2, said embossings preferably extending over the entire width of the filter medium 2 as shown in FIG. 3. This thereby results in fold edge 3 having the form of a surface. This double folding coupled with the surface, which is substantially at an obtuse angle to layers 5, 6, 7, gives the inventive semi-finished product 1 particularly high rigidity and stability.

An apparatus for producing the inventive semi-finished product is depicted by means of FIG. 8. Preferably, this apparatus comprises a third heating device 25 designed to heat the filter medium 2 which is preferably a nonwoven produced in a melt-spinning process. Preferably, the material is thereby brought to a temperature particularly well-suited to embossing. The filter medium 2 hereby passes through preferably likewise heated embossing rollers of the apparatus 20, whereby the embossing rollers are designed in particular to preconfigure the layers 5, 6, 7 of the filter medium 2, wherein each layer 5, 6, 7 comprises at least one first embossing 9a, 9b configured as a spacer to an adjacent layer 5, 6, 7, one second embossing 10a, 10b configured as a spacer to a further adjacent layer 5, 6, 7 and at least one third embossing 11a, 11b configured as a folding edge to at least one of the adjacent layers. The apparatus 20 comprises different components depending on whether the apparatus 20 is producing the first embodiment or the second embodiment of the inventive semi-finished product. To produce the first embodiment, it comprises a brushing device with which the filter medium 2 can preferably be brushed. Said brushing creates hooks and/or loops on the first surface A and/or on the second surface B, particularly in the region of the first embossing 9a, 9b and/or second embossing 10a, 10b, able to engage upon being non-adhesively joined. Preferably, the brushing device 26 can also be arranged in front of the embossing rollers 21, 22, as shown in FIG. 8, whereby the brushing device 26 can then in particular treat the full surfaces A, B on both sides of the filter medium 2.

A folding device 23 then subsequently folds the brushed filter medium 2 such that adjacent layers 5, 6; 6, 7 form along the third embossings 11a, 11b, whereby at least one pair of first embossings 9a, 9b and/or at least one pair of second embossings 9a, 9b of adjacent layers 5, 6; 6, 7 converge. When the first embodiment of the inventive semi-finished product 1 is being produced, the hooks and/or loops of the first surface A and the second surface B engage upon the folding, in each case particularly in the region of the first embossings 9a, 9b and/or the second embossings 10a, 10b, thereby preferably realizing the non-adhesive joining.

When the second embodiment of the inventive semi-finished product is being produced, additionally or alternatively to a brushing device 26, the apparatus comprises a connecting device 24 preferably arranged after the folding device 23 in the processing direction. Said connecting device 24 preferably comprises a heating device 18 designed to heat the filter medium 2 on one side, whereby fibers 12a, 12b, 12c, 13a, 13b, 13c of opposite first embossings 9a, 9b are at least partly melted. A connection is established upon the first melted fibers 12a, 12b, 12c of the first surface A coming into contact with the second melted fibers 13a, 13b, 13c of the second surface B.

It is further preferable for the inventive apparatus 20 to have a second heating device 19 designed to thermally treat a second side of the filter medium, whereby fibers 12a, 12b, 12c, 13a, 13b, 13c of each respective adjacent layer 6, 7 likewise melt and thereafter establish a connection.

An embodiment of the inventive method 100 for producing a semi-finished product 1 for a filter is described below on the basis of FIG. 9. The indicated sequence of procedural and/or process steps can hereby deviate from the sequence indicated in FIG. 9.

Preferably, the filter medium 2 is first heated 101. The heated filter medium 2 is then embossed 102 by two opposingly arranged heated embossing rollers 21, 22, whereby the embossing rollers 21, 22 are preferably designed so as to preconfigure layers 5, 6, 7 of the filter medium 2, wherein at least first adjacent layers 5, 6 exhibit at least one first embossing 9a, 9b configured as a spacer between two first adjacent layers 5, 6 and wherein adjacent layers 5, 6, 7 each exhibit at least one common third embossing 11a, 11b configured as a fold edge 3 between respectively adjacent layers 5, 6, 7. In a further step, first adjacent layers 5, 6 are folded 103 along the one third embossing 11a, 11b, whereby at least one pair of first embossings 9a, 9b of the first adjacent layers 5, 6 converge. When producing a first embodiment of the inventive semi-finished product, a first surface A of the filter medium 2 is thereupon brushed 104a such that loops and/or hooks 16a, 16b, 16c are produced on the at least one pair of first embossings 9a, 9b. When producing a first embodiment of the inventive semi-finished product, two adjacent layers 6, 7 are thereupon folded 106a along a further third embossing 11b, whereby at least one pair of second embossings 10a, 10b of second adjacent layers 6, 7 converge. Preferably, the second surface B of the filter medium 2 is then brushed 107a such that loops and/or hooks 17a, 17b, 17c are produced at least on the one pair of second embossings 10a, 10b. Lastly, the respective pairs of first embossings 9a, 9b and second embossings 10a, 10b are non-adhesively joined 105, 108a by the loops and/or hooks 16a, 16b, 16c, 17a, 17b, 17c coming into engagement.

The brushing process steps 104a, 107a can in particular also be performed prior to the folding 103, 106a so that the non-adhesive joining is already occurring during the folding procedures 103, 106a.

The method for producing the second embodiment of the inventive semi-finished product 1 comprises thermally treating a first side of the filter medium 2 by means of a first heating device 18 prior to or subsequent the folding 103 of two first adjacent layers 5, 6, by way of which fibers 12a, 12b, 12c, 13a, 13b, 13c of oppositely disposed first embossings 9a, 9b are at least partly melted. When the pairs of layers 5, 6; 6, 7 are brought together, the first embossings 9a, 9b converge and the fibers 12a, 12b, 12c, 13a, 13b, 13c of the first adjacent layers 5, 6 establish a connection.

The inventive method further preferably comprises the process step of folding 106b two adjacent layers 6, 7 along a further third embossing 11b, whereby at least one pair of second embossings 10a, 10b of the second adjacent layers 6, 7 converge. Prior or subsequent thereto, a second side of the filer medium 2 is preferably thermally treated 107b-1 by means of a second heating device 19, whereby fibers 12a, 12b, 12c, 13a, 13b, 13c of opposite embossings 10a, 10b at least partly melt. When being joined 107b-2, the second embossings 10a, 10b preferably meet and the fibers 12a, 12b, 12c, 13a, 13b, 13c of the two second adjacent layers 6, 7 establish a connection.

It is obvious to the person skilled in the art that the inventive method can be performed as many times and for so long as required to obtain a desired number of folds/foldings to e.g. fill a filter frame.

REFERENCE NUMERALS 1 semi-finished product
2 filter medium
3 fold edge
4 fibrous structure
5, 6, 7 layer
8 spacer
9a, 9b first embossing
10a, 10b second embossing
11a, 11b third embossing
12a, 12b, 12c first plurality of fibers
13a, 13b, 13c second plurality of fibers
14 first intermediate area
15 second intermediate area
16a, 16b, 16c first loops/hooks
17a, 17b, 17c second loops/hooks
18 first heating device
19 second heating device
20 apparatus
21, 22 embossing roller
23 folding device
24 brushing device
25 third heating device
I first fold plane
II second fold plane
D1 fold edge spacing in a first fold plane
D2 fold edge spacing in a second fold plane
T semi-finished product depth

The invention claimed is:

1. A semi-finished product (1) for a filter, particularly an air filter,
   wherein the semi-finished product (1) comprises a filter medium (2),
   wherein the filter medium (2) comprises a nonwoven having fibrous structure (4) produced in a melt-spinning process and at least partially arranged in pleated layers (5, 6, 7),
   wherein at least respective first adjacent layers (5, 6) exhibit at least one first embossing (9a, 9b) configured as a spacer (8) between the at least two first adjacent layers (5, 6),
   wherein at least one pair of first embossings (9a, 9b) of the at least one first adjacent layers (5, 6) are in contact,
   wherein adjacent layers (5, 6, 7) exhibit at least one common fold edge (3) formed by at least one third embossing (11a, 11b),
   wherein contacting pairs of embossings (9a, 9b; 10a, 10b) are stably and disengageably connected together by non-adhesive joining, wherein a plurality of fibers (12a, 12b, 12c; 13a, 13b, 13c) are joined at respective intermediate areas (14; 15) of contacting pairs of embossings (9a, 9b; 10a, 10b).

2. The semi-finished product (1) according to claim 1, wherein at least two respective second adjacent layers (6, 7) exhibit at least one second embossing (10a, 10b) configured as a spacer between the at least one second adjacent layers (6, 7) and wherein at least one pair of second embossings (10a, 10b) of the at least one second adjacent layers (6, 7) are in contact.

3. The semi-finished product (1) according to claim 2, wherein the at least two first embossings are arranged on a first side (A) of the filter medium (3) and the at least two second embossings are arranged on a second side (B) of the filter medium (2).

4. The semi-finished product (1) according to claim 1, wherein a spacing (D1, D2) of adjacent fold edges (11a, 11b)

of the pleated layer (5, 6, 7) in one fold plane (I, II) of the semi-finished product amounts to between 10 mm and 30 mm.

5. The semi-finished product (1) according to claim 1, wherein the ratio of a first adjacent fold edge spacing (D1) and/or second adjacent fold edge spacing (D2) to a depth (T) of the semi-finished product is between 0.05 and 0.15.

6. The semi-finished product (1) according to claim 4, wherein fold edges (11a, 11b) have different spacings (D1, D2) in different fold planes (I; II).

7. The semi-finished product (1) according to claim 1, wherein a first surface (A, B) and/or a second surface of respective adjacent layers (5, 6; 6, 7) at least in part comprise loops and/or hooks (16a, 16b, 16c; 17a, 17b, 17c) at least in the region of the embossings (9a, 9b; 10a, 10b) which are designed to engage upon the adhesive-free joining at the respective intermediate area (14; 15) of contacting pairs of embossings (9a, 9b; 10, 10b) and which are in particular formed by at least the plurality of fibers (12a, 12b, 12c; 13a, 13b, 13c).

8. The semi-finished product (1) according to claim 1, wherein the plurality of fibers (12a, 12b, 12c; 13a, 13b, 13c) of contacting pairs of embossings (9a, 9b; 10a, 10b) are at least partially fused at the respective intermediate areas (14; 15).

9. The semi-finished product (1) according to claim 1, wherein the first adjacent layers (5, 6) and/or the second adjacent layers (6, 7) are non-destructively disengageable, by the tearing apart of at least individual fibers, and/or by tearing apart of the plurality of fibers (12a, 12b, 12c) of the first adjacent layers from the first surface (A) and/or individual fibers, and/or by tearing apart of the plurality of fibers (13a, 13b, 13c) of the second adjacent layers (6, 7) from the second surface (B) and wherein the individual fibers take part in the non-adhesive joining.

10. The semi-finished product (1) according to claim 1, obtained or obtainable by brushing (104a) a first surface (A) of the filter medium (2) such that loops and/or hooks (16a, 16b, 16c) are produced on the at least one pair of first embossings (9a, 9b) which engage at a first intermediate area (14) upon the non-adhesive joining.

11. The semi-finished product (1) according to claim 10, obtained or obtainable by brushing (104a) a second surface (B) of the filter medium (2) such that loops and/or hooks (17a, 17b, 17c) are produced on the at least one pair of second embossings (10a, 10b) which engage at a second intermediate area (15) upon the non-adhesive joining.

12. The semi-finished product according to claim 1, obtained or obtainable by thermal treatment (104b-1) of a first surface (A) and the filter medium (2) by way of a first heating device (18) at least partly melting fibers (12a, 12b, 12c, 13a, 13b, 13c) of oppositely disposed first embossings (9a, 9b) and joining (104b-2) the first embossings (9a, 9b) upon their converging, wherein the fibers (12a, 12b, 12c, 13a, 13b, 13c) of the first adjacent layers (5, 6) establish a connection.

13. The semi-finished product (1) according to claim 12, obtained or obtainable by thermal treatment (107b-1) of a second surface (B) and the filter medium (2) by way of a second heating device (19) at least partly melting fibers (12a, 12b, 12c, 13a, 13b, 13c) of oppositely disposed second embossings (10a, 10b) and joining (107b-2) the second embossings (10a, 10b) upon their converging, wherein the fibers (12a, 12b, 12c, 13a, 13b, 13c) of the second adjacent layers (6, 7) establish a connection.

14. The semi-finished product (1) according to claim 13, obtained or obtainable by folding (103b) first adjacent layers (5, 7) along a third embossing (11a), wherein at least one pair of first embossings (9a, 9b) of the first adjacent layers (5, 6) converge; and/or folding (106b) second adjacent layers (6, 7) along a further third embossing (11b), wherein at least one pair of second embossings (10a, 10b) of the second adjacent layers (6, 7) converge.

15. The semi-finished product (1) according to claim 1, wherein the filter medium (3) has a fibrous structure in the region of the respective intermediate area (14; 15) between adjacent layers (5, 6; 6, 7), at the first intermediate area (14) and/or at the second intermediate area (15).

16. The semi-finished product (1) according to claim 1, wherein the common fold edge (3) incorporates two parallel straight third embossings (11a-1, 11a-2, 11b-1, 11b-2) over the entire width of the filter medium (3) such that the common fold edge is of trapezoidal form.

17. A filter comprising a semi-finished product (1) according to claim 1.

18. A method (100) for producing a semi-finished product (1) for a filter, wherein the semi-finished product (1) comprises a filter medium (2) having a nonwoven produced in a melt-spinning process, comprising the following process steps:
  heating (101) the filter medium (2);
  embossing (102) the heated filter medium (2) by means of two heated embossing rollers (21, 22) arranged opposite each other, wherein the embossing rollers (21, 22) are designed so as to preconfigure layers (5, 6, 7) of the filter medium (2), wherein at least respective first adjacent layers (5, 6) has at least one first embossing (9a, 9b) configured as a spacer between the at least two first adjacent layers (5, 6) and wherein respective adjacent layers (5, 6; 6, 7) have at least one shared third embossing (11a, 11b) configured as a shared fold edge (3) between the respectively adjacent layers (5, 6; 6, 7);
  folding (103a) the first adjacent layers (5, 6) along the at least one third embossing (11a), wherein at least one pair of first embossings (9a, 9b) of the first adjacent layers (5, 6) converge; and
  non-adhesively joining (105) the at least one pair of first embossings (9a, 9b), whereby the at least one pair of first embossings (9a, 9b) are stably and disengageably connected together.

19. The method (100) according to claim 18, further comprising the following process step:
  brushing (104a) a first surface (A) of the filter medium (2) such that loops and/or hooks (16a, 16b, 16c) are produced on the at least one pair of first embossings (9a, 9b) which engage when being non-adhesively joined (105).

20. The method (100) according to claim 19, further comprising the following process steps:
  folding (106a) second adjacent layers (6, 7) along a further third embossing (11), wherein at least one pair of second embossings (10a, 10b) of second adjacent layers (6, 7) converge; and
  brushing (107a) a second surface (B) of the filter medium (3) so as to produce loops and/or hooks (17a, 17b, 17c) on the at least one pair of second embossings (10a, 10b), and
  non-adhesively joining (108a) the at least one pair of second embossings (10a, 10b), whereby loops and/or hooks (17a, 17b, 17c) engage and the at least one pair of first embossings (10a, 10b) are stably and disengageably connected together.

21. The method (100) according to claim 18, further comprising the following process steps:

thermally treating (104b-1) a first surface (A) of the filter medium (2) by way of a first heating device (18) at least partly melting fibers (12a, 12b, 12c, 13a, 13b, 13c) of opposite first embossings (9a, 9b); and joining (104b-2) the first embossings (9a, 9b) upon their converging, wherein the fibers (12a, 12b, 12c, 13a, 13b, 13c) of the first adjacent layers (5, 6) establish a connection.

22. The method (100) according to claim 21, further comprising the following process steps:

thermally treating (107b-1) a second surface (B) of the filter medium (2) by way of a second heating device (19) at least partly melting fibers (12a, 12b, 12c, 13a, 13b, 13c) of opposite second embossings (10a, 10b); and joining (107b-2) the second embossings (10a, 10b) upon their converging, wherein the fibers (12a, 12b, 12c, 13a, 13b, 13c) of the second adjacent layers (6, 7) establish a connection.

23. The method (100) according to claim 22, further comprising the following process steps:

folding (103b) two adjacent layers (5, 6) along a third embossing (11a), wherein at least one pair of first embossings (9a, 9b) of the first adjacent layers (5, 6) converge; and/or folding (106b) two adjacent layers (6, 7) along a further third embossing (11b), wherein at least one pair of second embossings (10a, 10b) of the second adjacent layers (6, 7) converge.

24. An apparatus (20) for producing a semi-finished product (1) for a filter, wherein the semi-finished product (1) comprises a filter medium (2) having a nonwoven produced in a melt-spinning process, comprising:

a first heating device (25) designed to heat the filter medium (2);

heatable embossing rollers (21, 22), wherein the embossing rollers (21, 22) are designed so as to preconfigure layers (5, 6, 7) of the filter medium (2), wherein each layer (5, 6, 7) exhibits at least one first embossing (9a, 9b) configured as a spacer (8) to an adjacent layer (5, 6, 7), a second embossing (10a, 10b) configured as a spacer (8) to a further adjacent layer (5, 6, 7) and at least one third embossing (11a, 11b) configured as a fold edge (3) to at least one of the adjacent layers (5, 6, 7);

a folding device (23) designed to fold two adjacent layers along the at least one third embossing (11a, 11b) such that at least one pair of first embossings (9a, 9b) and/or at least one pair of second embossings (10a, 10b) of adjacent layers (5, 6; 6, 7) converge;

a connecting device (18, 19, 24) designed to non-adhesively join the at least one pair of first embossings (9a, 9b) and/or the at least one pair of second embossings (10a, 10b), wherein the embossings (9a, 9b; 10a, 10b) are stably and disengageably connected together, wherein the connecting device comprises at least one brushing device (24) designed to produce loops and/or hooks (15a, 15b, 15c; 16a, 16b, 16c) on a first surface (A) and/or on a second surface (B) of the filter medium (2) which are suited to engaging upon the non-adhesive joining.

25. The apparatus (20) according to claim 24, wherein the connecting device comprises at least one second heating device (18) designed to at least partly melt fibers (12a, 12b, 12c, 13a, 13b, 13c) of the first embossings (9a, 9b) oppositely disposed to the at least one first embossing (9a; 9b).

26. The apparatus (20) according to claim 25, comprising a third heating device (19), designed to at least partly melt the fibers (12a, 12b, 12c, 13a, 13b, 13c) of the second embossings (10a, 10b) oppositely disposed to the at least one second embossing (10a; 10b).

\* \* \* \* \*